Oct. 18, 1960 I. A. SMITH ET AL Re. 24,888

SCREW DRIVER WITH OFFSET WINGS

Original Filed April 18, 1958

INVENTORS

Ian A. Smith

Herman G. Muenchinger

BY

Watson, Cole, Grindle & Watson

ATTORNEYS

United States Patent Office

Re. 24,888
Reissued Oct. 18, 1960

24,888

SCREW DRIVER WITH OFFSET WINGS

Ian A. Smith, Willimantic, and Herman G. Muenchinger, Chaplin, Conn., assignors to American Screw Company, Willimantic, Conn., a corporation of Rhode Island Original No. 2,848,024, dated Aug. 19, 1958, Ser. No. 729,488, Apr. 18, 1958. Application for reissue Feb. 24, 1960, Ser. No. 10,824

12 Claims. (Cl. 145—50)

Matter enclosed in heavy brackets [ ] appears in the original patent but forms no part of this reissue specification; matter printed in italics indicates the additions made by reissue.

This application is a continuation-in-part of our application Serial No. 558,663, filed January 12, 1956, now abandoned.

This invention relates to driving tools for threaded fasteners, more particularly of the recessed head type.

Threaded fasteners having recessed or socketed heads, as distinguished from slotted heads, have come into widespread use in recent years, due in large part to the development of the so-called "Phillips" recess, and the proven superiority of recessed head screws, and other fasteners, particularly in manufacturing and assembly operations involving large quantities of such fasteners and likewise involving the use of power drivers. This trend has resulted in the provision of fasteners having improved torque capacity over slotted screws and the like, which fasteners may be driven much more quickly and efficiently, and with much less hazard to the work into which they are driven. However, the demand for still greater torque capacity (ability to be more securely tightened, i.e. driven home with greater force), continues to be felt, and thus the search for an improved tool recess continues.

The recess of the "Phillips" type cannot be increased in size or penetration beyond a certain proportion with respect to the size of the fastener, because of the relative proportions of the recess itself. That is, when the overall size of the recess is increased beyond a certain extent, the central portion of the recess penetrates below the depth of the fastener head and into the shank, thus undesirably weakening the screw at an already critical point, namely, the junction of the head and shank.

Another characteristic of the Phillips recess which limits its usefulness is that, due to its symmetrical design, it is rather susceptible to the unfavorable effect known as "rock-out," that is, the tendency of the driving tool to incline or rock laterally along one or the other of the crossed groove axes, and thus dislodge itself from the recess, or at least depart sufficiently from its proper coaxial relationship with the fastener so that difficulty is encountered in properly driving the fastener, possible damage to the fastener, the work, or both, resulting from this condition. Attempts to develop a "Phillips" recess of wider and shallower proportions, in order to overcome the effect noted in the preceding paragraph, have the result of increasing the "rock-out" characteristic of the recess, which thus becomes a limiting factor.

However, the "rock-out" effect is not limited to screw recesses of the so-called Phillips type, but is encountered to a greater or lesser degree in driving screws having various types of recesses, slots or other tool-engaging means. It is caused by at least two factors which, though always present, have become of increasing importance due to the large increase in applied torque which has been employed in recent times. The two factors in question are (1) the inevitable loose fit of driver and recess, due to manufacturing tolerances and which, also, is to a degree indispensable in order to facilitate entry of the driver into the recess; and (2) deflection of driver wings and groove walls. This deflection, which of course has a more pronounced effect on the driver wings than on the groove walls, is a function of applied torque. In earlier times when the screws were driven by the use of conventional hand screw drivers or power drivers of relatively low torque capacity, the said deflection effect was not of serious proportions. However, with the use of increased applied torque by means of power drivers, and particularly since it has become the practice, in many instances, to apply the final tightening effort through a "torque wrench," deflection of the driver wings has become a serious problem, particularly as it affects the aforesaid "rock-out" characteristic.

The comparatively loose fit of the driver bit in the screw recess aggravates the rock-out problem no matter what the form of the screw recess and, as mentioned above, such loose fit is inevitable in commercial practice. Moreover, the tendency in screw recess development has been toward shallower and still shallower recesses. Any recess, if deep enough, will substantially eliminate the rock-out problem, but it is impractical for various reasons to make and use screws having recesses which are deep enough to serve this purpose.

Driver wing deflection takes the form of a spiral deformation of the wings. That is, since the upper edges of the wings are integral with the shank of the driver bit the wing deflection, measured in degrees, increases downwardly toward the tip of the driver bit. The result is a spiral deformation of the wings, causing a reaction the axial component of which is a force tending to throw the driver out of the recess, and which also enhances the rock-out effect.

The torque used in driving recessed-head screws has been increased, in the last decade, by at least ten times, and characteristics which were formerly of little or no importance have become critical. One of these is the rock-out characteristic discussed above, and since the final tightening is now frequently performed by means of the aforesaid "torque wrench" which applies all of the torque on one side of the screw, giving an unbalanced force on the driver, the danger of rock-out is vastly increased.

The torque capacity of the screw and driver combination is also subject to limitation by reason of the design of the driver tip, which is of course substantially complementary to the screw recess. If the recess has a sufficiently high torque capacity, the overall capacity of the combination may depend upon the capacity of the driver, failure of the latter frequently occurring due to an inadequate strength through the central portion of the driver tip, corresponding to the central portion of the screw head recess.

We have recently invented a threaded fastener having a tool-receiving recess designad to impart a maximum torque capacity to the screw itself, while at the same time eliminating the aforesaid "rock-out" characteristic and also permitting the use of a stronger driving tool, all of which factors result in a substantial increase in the overall torque capacity of the screw and driver combination, and increase its usefulness. The general object of the present invention is the provision of a driving tool for use with the new recess, which is more particularly described in our copending application Serial No. 494,726, filed March 16, 1955, *now U. S. Patent No. 2,847,894. An application for reissue of said patent is now pending under Serial No. 3,218, filed January 18, 1960.*

Another object is the provision of a driver for threaded fasteners having tool-engaging recesses with offset grooves, which driver comprises a shank portion and a bit portion formed on one end thereof, said bit portion comprising a central nib having alternate wings and channels, said wings extending generally radially but having their medial planes offset rearwardly relatively to the direction of driving rotation, the driving wall of each said wing being disposed closer to a true radial plane parallel to said medial plane than is the removing wall.

A further object of the invention is the provision of a driving tool of the character described, the central nib being of larger diameter and, accordingly, of greater strength than is possible of achievement with driving tools of the designs heretofore employed, whereby the overall torque capacity of the screw and driver combination is substantially enhanced.

Another object is the provision of a driving tool of the character described, the substantially radial wings being arranged in angularly spaced oppositely directed pairs, the wings of each pair being staggered or displaced with respect to each other so as to eliminate "rock-out."

Other and further objects, features and advantages will be apparent from the description which follows, read in connection with the accompanying drawings in which.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1:
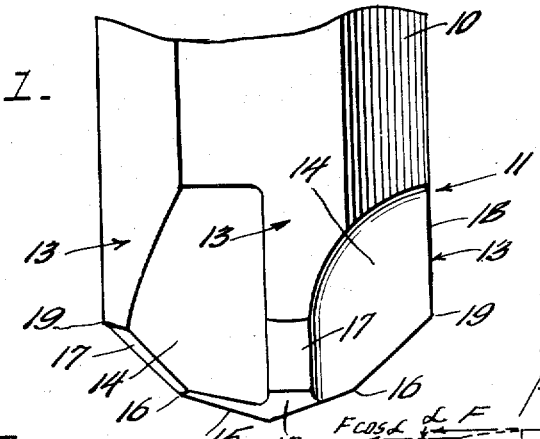
Figure 1 is a fragmentary side elevational view of a driving tool fashioned in accordance with the present invention.
Figure 2:
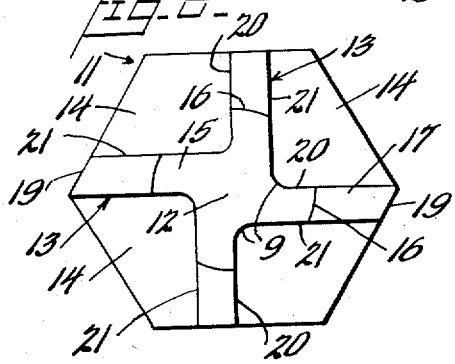
Figure 2 is an end elevation of the tool illustrated in Figure 1.

Referring to Figures 1 and 2, the driving tool there illustrated comprises a shank portion 10 which may be of any suitable length and may be fitted with a handle, for manual use, or may be adapted to be gripped in the chuck of a power tool. One end of the shank 10 is shaped to form a bit portion designated generally by the reference numeral 11 and comprising a central nib 12 having alternate wings 13 separated by channels 14, the wings 13 projecting substantially radially from the nib 12. The tip of the latter preferably is formed as a shallow inverted cone, the conical surface 15 extending outwardly to a line 16 on the bottom wall of each wing 13. A second conical surface forms the bottom wall portion 17 of each wing 13, joining the peripheral wall portion 18 of the wing along the line 19. As seen in Figure 2, the channels 14 are so formed as to leave flat wall portions on the adjacent sides of adjacent wings, the wing wall portion 20 being designated as the driving wall of the wing, since the wall 20 transmits driving torque to the fastener when the latter is provided with the usual right-hand thread. The opposite wing 21 is designated as the "removing" wall of the wing. The wall 20 of each wing is joined to the wall 21 of the adjacent wing by a curved surface 9.

In the embodiment illustrated in Figures 1 and 2, the driving wall 20 of each wing 13 lies on a true radial plane, i.e. lies in a plane which also contains the longitudinal axis of the driving tool, while the removing wall 21 is displaced somewhat rearwardly, relative to the direction of driving rotation of the tool. Preferably, though not essentially, the walls 20 and 21 are parallel to each other and, hence, to the medial plane of the wing, said medial plane being offset rearwardly relative to the direction of driving rotation. The medial plane, thus, is not a true radial plane but is substantially parallel to a true radial plane, i.e. one containing the longitudinal axis of the driving tool.

Figure 4:
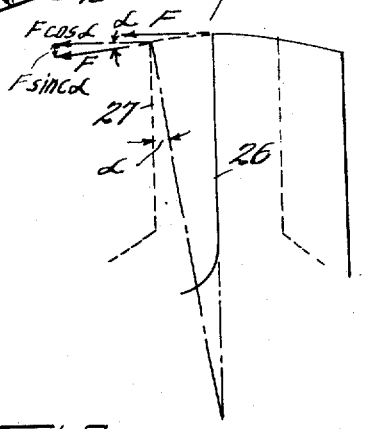
Figure 4 is a diagram illustrating an advantage of the present screw driver form.

By virtue of the construction thus described, it will be seen that the several wings of the driver are offset or staggered in such a manner that, when used with a fastener having a complementary recess, the "rock-out" characteristic is substantially eliminated, the driving tool being removable from the recess only in a substantially axial direction. Also, *in the embodiment of Figures 1 and 2*, by virtue of the fact that the driving walls 20 lie on or near truly radial planes, the turning force exerted thereon by the handle or power tool, as the case may be, is transmitted to the recess walls of the fastener in an exactly normal or substantially normal direction, for greatest efficiency. Thus in Figure 4 it may be seen that a turning force F applied by the wing surface 26 of a driver of the present invention is all useful, while the same force applied to the corresponding surface of a screw having a symmetrical recess surface by the surface 27 of a symmetrical driver includes a component F sine $\alpha$ which is not only not useful, but is harmful since it tends to deform the screw recess, the driver wings, or both. The angle $\alpha$ is the angle between the side wall of a groove of a conventional "Phillips" recess, and a plane containing the screw axis (i.e. a radial plane) and containing the intersection of said groove side wall with the top of the end wall of the groove. The useful component of the turning force transmitted through the screw driver is, of course, that component which is normal to a radial plane of the driver.

Figure 3:
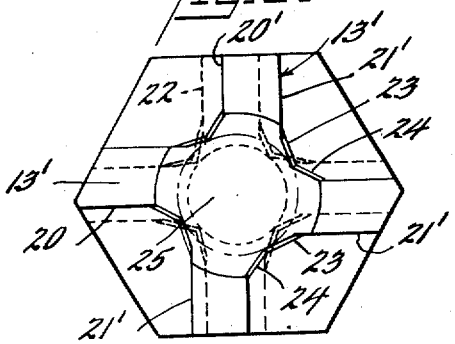
Figure 3 is an end elevation of a modification of the tool illustrated in Figures 1 and 2, superimposed upon the corresponding outline of a prior art driver (the latter being shown in dotted lines)

The effect just noted may be appreciated from a comparison of the respective outlines shown in Figure 3, in which the dotted outline of the bit portion of a conventional "Phillips" driver is indicated at 22, while the bit portion of a driver constructed in accordance with the present invention is seen in solid lines. In the embodiment illustrated in Figure 3, the wings 13' are offset rearwardly, but not to the extent shown in Figures 1 and 2, the driving walls 20' of Figure 3 being closely adjacent true radial planes, rather than disposed in such planes. Adjacent walls of adjacent wings are connected by two intersecting plane surfaces 23 and 24 rather than by the single curved surface 9 of Figure 2.

Figure 3 illustrates how the nib 25 of the driving tool constructed in accordance with the invention having offset wings larger cross-sectional area will have a better section modulus than the corresponding nib of a conventional "Phillips" driver, thus enhancing the overall strength of the driver and of the screw and driver combination. The section modulus may be considered the ratio of the maximum cross-section of the bit to the maximum radius, in this case, the distance from the center to the furthest point on line 19, Figures 1 and 2. It will be recognized that the section modulus is a true measure of the torsional strength or deflection and, therefore, the offsetting of the wings has a strengthening effect independent in itself of the increase in cross-sectional area.

*As in the case of the anti-rock-out effect, the strengthening effects due to increase of cross-sectional area and improvement of the section modulus are achieved by offsetting the wings, regardless of the direction of offset.*

It will be apparent that when the wings 13 or 13' of a driver, according to the present invention, are offset rearwardly relative to the driving direction, the removing walls 21 or 21' are increased in area, thus facilitating the use of the tool in the removal of fasteners which have become "frozen" in place. This increase in area of the removing walls of the wings, together with the enlargement of the diameter of the nib portion of the driver, considerably enhances the usefulness of the driver in the removal of such fasteners.

The nib surfaces connecting adjacent walls of adjacent wings may be either curved or flat, as desired, regardless of the degree of offset of the wings themselves. That is, the flat surfaces 23, 24 of Figure 3 may be substituted for the curved surfaces 9 of Figure 2, and vice versa. Also, while the wings 13 are preferably arranged in angularly spaced, oppositely directed pairs, an odd number of wings may be employed in special cases, if desired.

Figure 5:
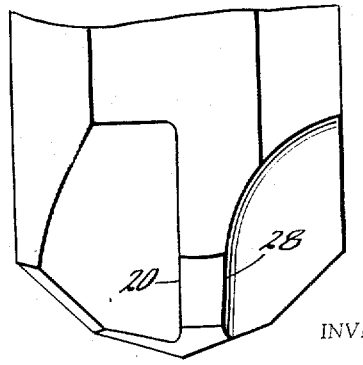
Figure 5 is a view similar to Figure 1 illustrating a further modification.

In some cases it may be desirable, in order to facilitate entry of the driver into its mating recess, to provide wing walls which converge downwardly, thus imparting to the wings a slight vertical taper. This may be accomplished by providing either or both of the generally radial wing walls with a slight vertical inclination to the driver axis. Thus, in the embodiment illustrated in Figure 5, which otherwise corresponds precisely with Figure 1, the wall 28 is shown as tapering downwardly toward the driving wall 20 which, in this embodiment, is precisely radial.

As employed in the claims hereof, the expression "vertical medial plane" is intended to signify a plane which is substantially parallel to the longitudinal axis of the driver and contains (1) the midpoint of a line joining the intersections of the respective wing walls 20 and 21 with the outer edge of the bottom wall 17, and (2) the midpoint of a line joining the intersections of the respective wing walls with the inner edge of the bottom wall.

If the walls 20 and 21 are parallel or have equal and opposite horizontal and/or vertical tapers, the vertical medial plane of each wing will be exactly parallel to some radial plane (i.e. a plane containing the driver axis). If the respective walls 20 and 21 differ in vertical taper the "vertical medial plane" will have a slight inclination to the driver axis and thus to any radial plane, while if the walls 20 and 21 differ in horizontal taper, but not in vertical taper, the "vertical medial plane" will nevertheless be parallel to a true radial plane. In the appended claims, the "true radial plane" to which the side walls of each wing are referred, is that radial plane to which the "vertical medial plane" is most nearly parallel.

Having thus described the invention, what is claimed as new and desired to be secured by Letters Patent is:

1. A driver for threaded fasteners having recessed heads, said driver comprising a shank portion and a shaped bit portion, the bit portion providing a central nib and a plurality of wings extending outwardly therefrom, said nib projecting axially beyond said wings, said wings extending generally radially and with equal engularities of less than 180° between adjacent wings, and having their vertical medial planes substantially parallel to, but displaced from, true radial planes, the driving wall of each said wing lying closer to said respective substantially parallel true radial plane than does the opposite wall of the same wing.

2. A driver as defined in claim 1, said driving walls lying in planes parallel to said true radial planes.

3. A driver as defined in claim 1, said wing walls lying in planes parallel to said true radial planes.

4. A driver as defined in claim 1, said driving walls lying in said radial planes.

5. A driver as defined in claim 1, said wings being arranged in equally angularly spaced, oppositely directed pairs.

6. A driver as defined in claim 5, said wings being four in number.

7. A driver as defined in claim 1, said driving and opposite walls of each wing lying in planes differing slightly in angular relation to the driver axis, said vertical medial planes being slightly inclined to said axis.

8. A driver as defined in claim 7, said driving walls lying in planes parallel to said axis.

*9. A driver for threaded fasteners having recessed heads, said driver comprising a shank portion and a shaped bit portion, the bit portion providing a central nib and a plurality of wings extending outwardly therefrom, said nib projecting axially beyond said wings, said wings extending generally radially and with equal angularities of less than 180° between adjacent wings, and having their vertical medial planes substantially parallel to, but displaced from, true radial planes, one wall of each said wing lying closer to said respective substantially parallel true radial plane than does the opposite wall of the same wing.*

*10. A driver as defined in claim 9, said wing walls lying in planes parallel to said true radial planes.*

*11. A driver as defined in claim 9, said wings being four in number and arranged in equally angularly spaced, oppositely directed pairs.*

*12. A driver as defined in claim 9, said walls of each wing lying in planes differing in angular relation to the driver axis, said vertical medial planes being slightly inclined to said axis and said driving walls lying in planes parallel to said axis.*

References Cited in the file of this patent or the original patent

UNITED STATES PATENTS

| | | |
|---|---|---|
| 789,274 | Hamlon | May 9, 1905 |
| 1,080,707 | Mackie et al. | Dec. 9, 1913 |
| 1,758,945 | Grube | May 20, 1930 |
| 1,844,241 | Bryant | Feb. 9, 1932 |
| 2,046,837 | Phillips | July 7, 1936 |
| 2,601,453 | Phipard | June 24, 1952 |

FOREIGN PATENTS

| | | |
|---|---|---|
| 7,741 | Germany | Oct. 17, 1879 |